United States Patent

[11] 3,569,684

[72] Inventor Gerald J. Burnett
Anaheim, Calif.
[21] Appl. No. 625,395
[22] Filed Mar. 23, 1967
[45] Patented Mar. 9, 1971
[73] Assignee North American Rockwell Corporation

[54] SINE-COSINE GENERATOR COMPRISED OF A DIODE ARRAY
7 Claims, 4 Drawing Figs.

[52] U.S. Cl. .......... 235/152, 235/186
[51] Int. Cl. .......... G06q 7/22
[50] Field of Search .......... 235/152, 186, 189, 197; 340/173, (Inquired), 347

[56] References Cited
UNITED STATES PATENTS

| | | | |
|---|---|---|---|
| 3,245,051 | 4/1966 | Robb .......... | 340/173 |
| 3,259,736 | 7/1966 | Martinez .......... | 235/186X |
| 3,391,395 | 7/1968 | Chen .......... | 340/173 |
| 3,423,736 | 1/1969 | Ash et al. .......... | 340/173 |

*Primary Examiner*—Malcolm A. Morrison
*Assistant Examiner*—Joseph F. Ruggiero
*Attorneys*—William R. Lane, L. Lee Humphries and Robert G. Rogers

ABSTRACT: A sine-cosine generator comprised of a diode array forming a fixed memory for storing binary values of the sines of angles and an array integral with the memory array for addressing locations within said memory. The preferred embodiment uses a diode array to mechanize an interpolation scheme for reducing the storage requirements when high accuracy sine-cosine values are required.

INVENTOR.
GERALD J. BURNETT
BY Robert G Rogers
ATTORNEY

INVENTOR.
GERALD J. BURNETT
BY
ATTORNEY

SINE-COSINE GENERATOR COMPRISED OF A DIODE ARRAY

BACKGROUND OF THE INVENTION

1. Field of the Invention

The invention relates to a sine-cosine generator comprised of an addressable diode memory array and, more specifically, to such a generator wherein the binary values of trigonometric functions are stored in a fixed memory array and can be read out when addressed. 2. Description of Prior Art.

Applicant is unaware of any art which anticipates the invention described herein. In one prior art system, the cordic algorithm for generating sines of input angles was mechanized by a special serial (or bite parallel) arithmetic unit comprised of three adder-subtractors using special interconnections. The arithmetic unit performed a sequence of simultaneous conditional additions or subtractions of numbers shifted into each of the three registers. A number of arc tangents used in the addition were stored in a computer memory.

The cordic system differs from the inventive system described herein in that is uses a different algorithm, requires substantially more hardware to mechanize, and is considerably slower. A sine generation, for example, may take as much as 100 microseconds with the time increasing as the requirement for accuracy increases.

The typical system for generating sine or cosine values in programmed computers uses a software mechanization of a polynomial approximation. Accuracy of an approximation scheme increases as a function of the number of terms in the polynomial. A typical approximation for 16 bit accuracy used in a sine generation system has a form of, $\sin\left(\frac{\pi}{2} X\right) = C_1 X + C_3 X^3 + C_5 X^5 + C_7 X^7$, where the C'5 are stored constants. The typical approximation implemented in a computer system which requires 33 microseconds to multiply and 6 microseconds to add, requires 211 microseconds to generate a sine value. This speed also increases as the accuracy increases.

The invention described herein stores the sine values of input angles in a fixed memory diode array. If an interpolation scheme is used, the data necessary to complete the scheme is also stored. A data word having a length, for example, from a few bits to 36 bits, can be read out in approximately 1 microsecond. The complete process of reading the information from the memory may require 1 additional microsecond. If the array is coupled with a 2 microsecond adder, which may comprise part of a computer or an off-line device, the complete sine or cosine generation may require only 4 microseconds. The only other problem is to adjust the date value to one of four quadrants. In other words, the sine values from 0° to 90° are the same as the sine values from 90° to 180°, 180° to 270°, and from 270° to 360°, except that the sign is different. This means that the angle input to the memory must be adjusted to the first quadrant by the computer and the sign of the result stored. This adjustment simply requires converting an angle in the second, third or fourth quadrant to an angle in the first quadrant that has the same magnitude sine value. The sign of the resulting value must also be stored (quadrants 1 and 2 are positive; quadrants 3 and 4 are negative). For example, an input Θ in the second quadrant is subtracted from 180° and the resulting angle is used to address the fixed memory.

SUMMARY OF THE INVENTION

The invention comprises a fixed diode memory array, preferably a silicon on sapphire diode array for storing binary numbers representing the sines of input angles including means integral with the memory for addressing locations within the memory. Means are included for reading out the values stored in the address locations. If an interpolation technique such as the Taylor Series is mechanized, the memory also stores binary numbers necessary to complete the scheme.

In one example of an operable embodiment, the analogue values of angles measured in radians are picked off, for example, from a gyro or other inertial instruments and converted into a binary number representing an angle Θ. The number is used as an input to the address means of the system for selecting the location in the fixed memory wherein the sine of the angle is stored The information is read out and compared with the value of the sine of the angle which should have been read from the memory of a computer. If the value is different from the required value, an error signal is generated to correct the position of the instrument from which the angle was picked off.

In one embodiment, to reduce the requirement for extensive memory, an interpolation technique is mechanized. In that embodiment, the information necessary to complete the scheme is also stored.

If the cosine of the angle Θ is desired, the value of the sin (Θ + 90°) adjusted to the first quadrant is read from the memory. The quadrant adjustment is performed in a computer system or other hardware separate from the diode memory.

Therefore, it is an object of this invention to provide an improved sine-cosine generator mechanized by diode array.

It is another object of this invention to provide an improved sine-cosine generator having faster speed for generating sines or cosine values.

Still another object of this invention is to provide a sine-cosine generator comprised of a fixed memory diode array having sine values stored at locations therein.

Still another object of this invention is to provide a sine-cosine generator requiring less hardware to mechanize.

A still further object of this invention is to provide a sine-cosine generator comprised of a fixed diode array having relatively faster speed and requiring relatively less hardware to mechanize.

Another object of this invention is to provide a sine-cosine generator mechanized by a silicon on a sapphire fixed diode memory array having relatively faster speed for generating sine and cosine values for input angles.

These and other objects of this invention will become more apparent in connection with the following drawings.

DESCRIPTION OF PREFERRED EMBODIMENTS

Figure 1:
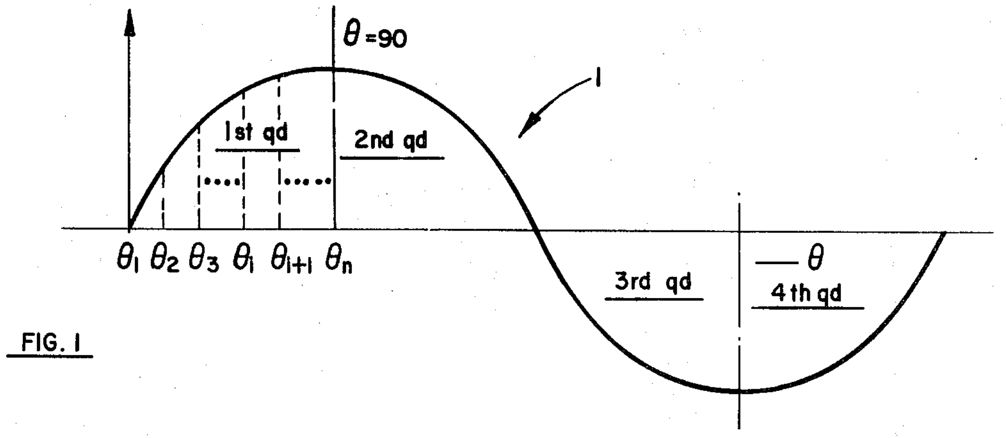
FIG. 1 represents a sine wave divided into approximation areas for using the Taylor Series approximation.

FIG. 1 shows sine wave 1 divided into $n$ equally spaced points, $\Theta_1 = 0°$ through $\Theta_n = 90°$, in the first quadrant. The first quadrant includes angles from 0° to 90°. Although only six approximation points are shown, it should be obvious that as many approximations as are required for a particular accuracy may be used. As the requirement for accuracy increases, the requirement for increasing the size of the memory also increases. The value of the sine (or cosine) of the angle at each of the points indicated and at other points between 0° and 90° can be stored in a fixed memory array such as described in connection with FIG. 3. However, in order to avoid using large amounts of memory for storage when high accuracy is desired, an interpolation technique should be used. Of course, sine (or cosine) values of angles not between 0° and 90° can be calculated from sine values between 0° and 90°. All that is required is to adjust the input angle to the first quadrant and then to use the result read from memory (if the original input angle is in the first or second quadrant) or use the complement of the result read from memory (if the original input angle is in the third or fourth quadrant).

An efficient interpolation scheme has been developed using the linear Taylor Series approximation to sine Θ. This approxi- $\Delta\Theta = \Theta - \Theta_i - \Delta\Theta$ is the last $(X-m)$ bits of $\Theta$.
Cos $\Theta_i$, where $\Theta$ is equal to an $X$ bit binary value assigned to an input angle, and, $\Theta_i \leq \Theta \leq \Theta_i+1$
$\Theta_i = O, \Theta_{1,2}, \Theta_3 \ldots 90° - \Theta_i$ is the first $m$ bits of $\Theta$.
$\Delta\Theta = \Theta - \Theta_i - \Delta\Theta$ is the last $(X-m)$ bits of $\Theta$.
Cos $\Theta$ is obtained from the above scheme by using the trigonometric identity: Cos $\Theta$ = Sin ($\Theta$ = 90°). 90° is then simply added to $\Theta$ and the resulting angle adjusted to the first quadrant is used in the above approximation for $\Theta$.

Figure 4:
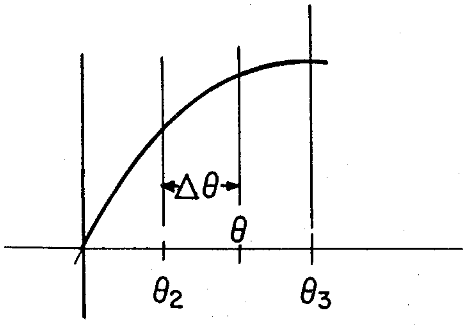
FIG. 4 illustrates the location of Δ Θ used in the Taylor Series approximation.

As shown in FIG. 4, $\Delta\Theta$ is the change from $\Theta_i$ to $\Theta$. If $\Theta_i$ is equal to $\Theta_2$ of 40° and $\Theta$ is equal to 45°, $\Delta\Theta$ would be equal to 5°.

Figure 2:
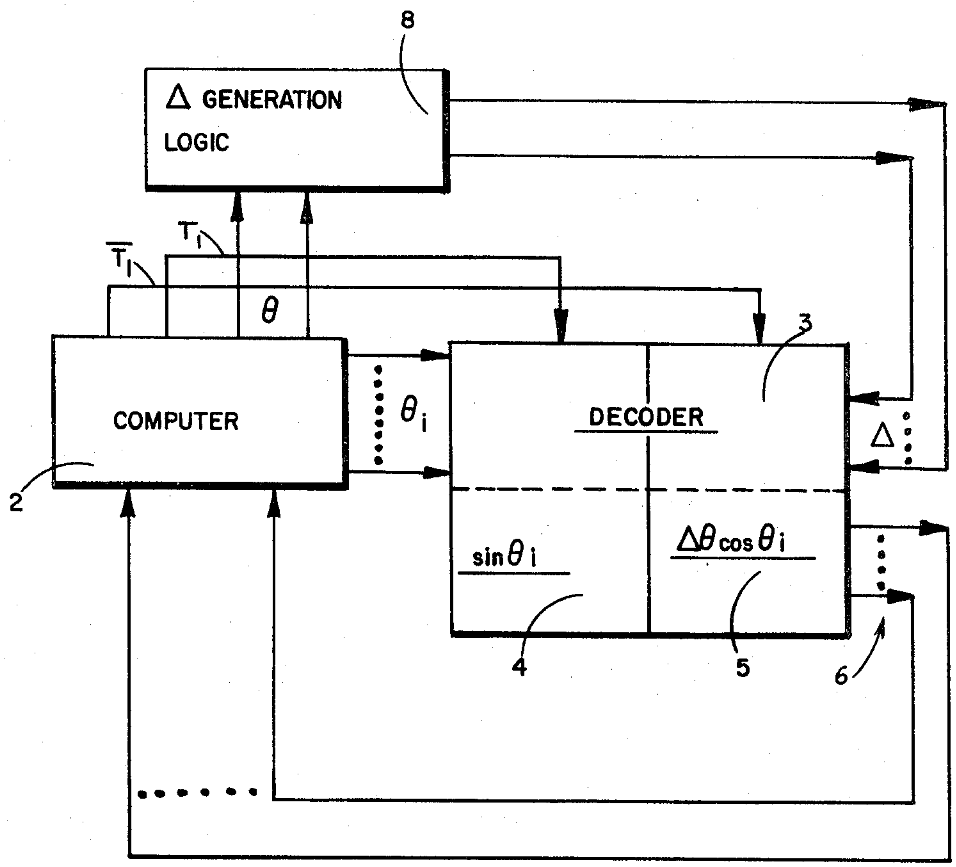
FIG. 2 illustrates a schematic diagram of a system for generating sine-cosine values.

FIG. 2 illustrates a schematic diagram of an example of an operable embodiment of the system for generating sine-cosine values from input angles. In a practical system, means such as a computer 2 provides various inputs to the FIG. 2 system. The inputs are usually in binary form representing an angle or some part of an angle as indicated by the above equations. More specifically, computer 2 provides $\Theta_i$ inputs (most significant bits of angle $\Theta$) to the decoder section 3. It also generates control signals $T_1$ and $\overline{T}_1$ for synchronizing outputs from storage locations 4 and 5. In addition, a binary number representing the angle $\Theta$ is provided as an input to $\Delta$ generation logic 8 which receives the number and converts it to a number representing the $\Delta$ increment of the angle computed as indicated above.

The particular embodiment illustrated provides a system for generating sines of angles by using the linear Taylor Series approximation, as previously described in connection with FIG. 1. Therefore, instead of using extensive storage for sin $\Theta$ values, the system portion 4 for storing sine $\Theta_i$ values binary, and a second portion 5 for storing $\Delta\Theta$ cos $\Theta_i$ vales in binary. The $\Delta\Theta$ cos $\Theta_i$ values could have been generated by reading sin $(\Theta_i + 90°)$ from memory storage and multiplying it by $\Delta\Theta$. However, since $\Delta\Theta$ cos $\Theta_i$ values are small and require relatively little storage space, the product can be stored as easily as the incremental values. The $\Delta\Theta$ cos $\Theta_i$ values can be seen to be small since cos $\Theta_i$ is always one or less while $\Delta\Theta$ has $m-1$ zeros following the binary point. This is the case because $\Delta\Theta$ is the last $(X-m)$ bits of $\Theta$. This then means that with a resultant sine $\Theta$ on the order of the accuracy of the input $\Theta$, the $\Delta\Theta$ cos $\Theta_i$ value will only provide an increment to sin $\Theta_i$ in its least significant bits. Storage of the product also saves time since a separate cos $\Theta_i$ value does not have to be read and since the multiplication $\Delta\Theta$ cos $\Theta_i$ does not have to be carried out. Computer 2 generates an output $\Theta_i$ representing the address of the most significant bits of the angle $\Theta$. The address is decoded by decoder 3 for addressing sin $\Theta_i$ storage locations in portion 4 of the FIG. 2 system. Signal $T_1$ is true during the period sin $\Theta_i$ values are being addressed. As a result, the stored values for sin $\Theta_i$ are read out during $T_1$ on line 6.

Portion 5 of the system stores $\Delta\Theta$ cos $\Theta_i$ values so that all values necessary to compute sin $\Theta$ are stored in various locations provided by portions 4 and 5. Signals from computer 2 representing the angle $\Theta$, which is known, is converted into a binary number representing the least significant bits, or the fractional portion, of the angle $\Theta$. That number provides a $\Delta$ input to decoder 3 which is decoded for addressing locations in portion 5 of the system. When portion 5 is addressed, control signal $T_1$, or $\overline{T}_1'$, as it may be designated, becomes true.

Since $\Delta\Theta$ cos $\Theta_i$ adds only a small increment to the sin $\Theta_i$ value, there are more sin $\Theta_i$ values than there are $\Delta\Theta$ cos $\Theta_i$ values. The $\Delta$ generation logic generates $\Delta$ values from $\Theta$ values so that one $\Delta\Theta$ cos $\Theta_i$ value can be chosen from multiple $\Theta$ input angles. Logic gates for implementing $\Delta$ generation logic 8 are believed within the abilities for a person skilled in the art and for that reason additional details are not given herein. In fact, the $\Delta$ generation logic function can be performed by a programmed subroutine in computers according to known techniques. $\Delta$ generation is described in the text entitled Introduction to the Theory of Switching Circuits by E. J. McCluskey, published by McGraw-Hill, New York, 1965, Pages 78—79, 140—156.

Outputs on output terminals designated generally by numeral 6 are received and processed by computer 2. The sin $\Theta_i$ is read out first, as indicated above, when $T_1$ is true. Thereafter, the $\Delta\Theta$ cos $\Theta_i$ value is read out when $\overline{T}_1$ is true. The binary outputs are added in the computer which may be programmed to execute an add subroutine.

In a specific application, the sum sin $\Theta_i + \Delta\Theta$ cos $\Theta_i$, which equals sin $\Theta$, is compared with another number also representing the sin of an angle $\Theta$ for generating an error signal. The stored sin $\Theta$ represents a reference value.

The interpolation scheme saves the maximum amount of storage if $\Delta\Theta$ is chosen to be the last $(X-m)$ bits ($X$ is the number of bits in $\Theta$ and $m$ is the number of bits in $\Theta_i$) of $\Theta$ with $(X-m)$ chosen less than or equal to one-half the number of bits to the right of the binary point in $\Theta$. The resulting sin $\Theta$ will then also be as accurate as the input angle $\Theta$ since the accuracy of the interpolation scheme is on the order of $\Delta\Theta^2/2$. For example, an input $\Theta$ of 12 bits with 11 bits to the right of the binary point would use a 5-bit $\Delta\Theta$.

As an example of the power of this interpolation scheme, a memory and decoder portion of 6,720 bits using a matrix of 96 by 70 conductors is required to obtain the sine of any angle, $\Theta$, to 13 bit accuracy. A memory 34 times as large would be required for mechanizing the memory and decoder portion without any interpolation scheme. The primary reason for the difference in the storage requirement, as previously indicated, is that the product $\Delta\Theta$ cos $\Theta_i$ is a relatively small number and does not require substantial memory.

Figure 3:
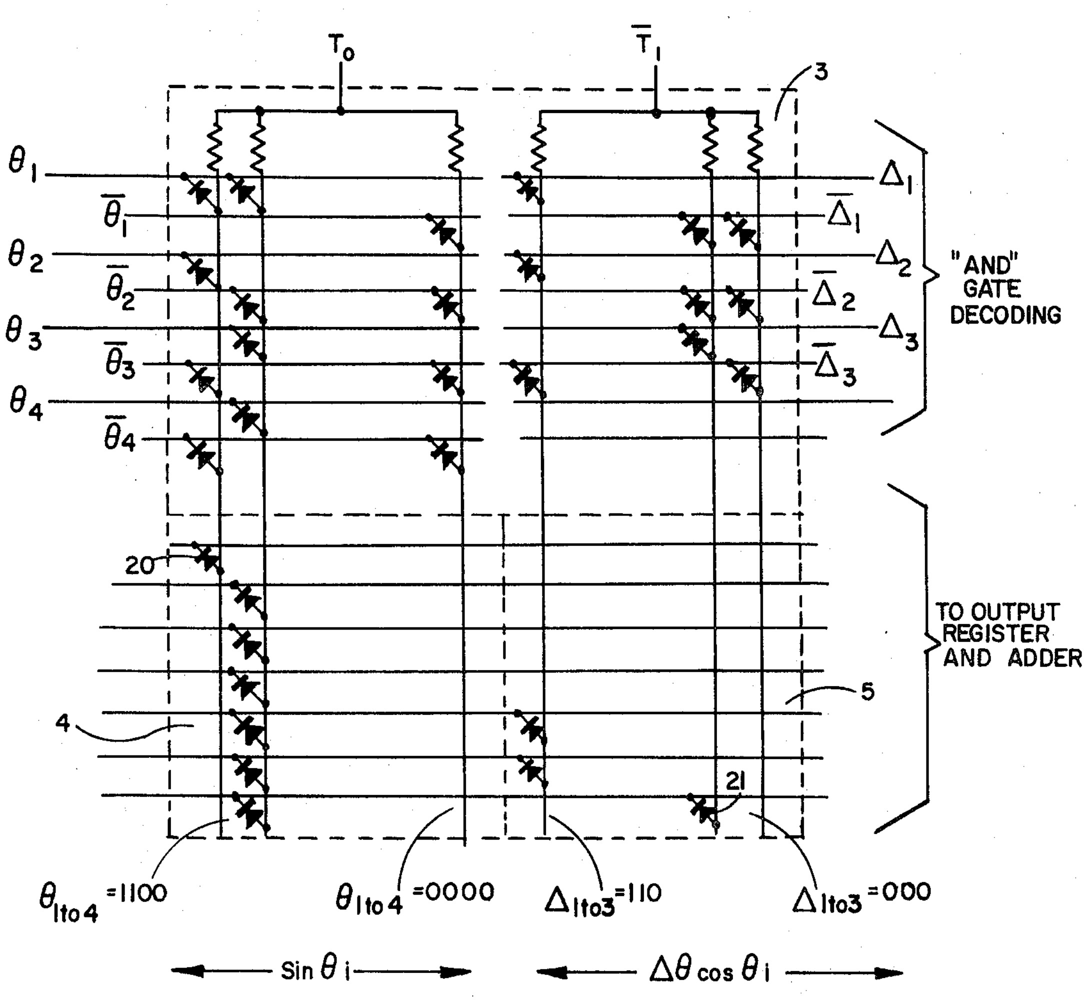
FIG. 3 illustrates a specific embodiment of a fixed diode memory array including means for addressing locations in the memory array.

FIG. 3 shows a specific embodiment of the decoder 3 and fixed memory portions 4 and 5 described in connection with FIG. 2. The sine wave signal illustrated in connection with FIG. 1 is divided into only 13 approximation points (a four bit $\Theta_i$ is used) for simplicity in describing the fixed diode memory array. In a practical embodiment, the sine wave could be divided into as many approximation points as required in order to generate a sine value having a required accuracy. For the particular embodiment shown $\Theta$ is six bits and the decoder, or address, portion comprises inputs $\Theta_1$ through $\Theta_4$ and $\Delta_1$ through $\Delta_3$. The $\Theta$ inputs are actually just $\Theta_i$ or the upper four bits of $\Theta$. They address storage locations for sin $\Theta_i$ values. The $\Delta$ inputs are generated from $\Theta$ and address storage locations for the $\Delta\Theta$ cos $\Theta_i$ values. Control input lines $T_1$ and $T_1'$ select which group of locations to address.

The decoding section is integral with the fixed memory array in FIG. 3 although in other embodiments the sections could be separated. Because of the simplicity and technology used in producing diode arrays, it is more practical to produce the sections together as an integral system. The output lines generate either the output from the sin $\Theta_i$ locations, or the $\Delta\Theta$ cos $\Theta_i$ locations. Subsequently, as indicated, the values are added in order to generate sin $\Theta$ values.

Although other processes and materials may be used in producing the decoder and storage sections, one method for producing the array comprises forming a plurality of silicon PN junctions on a sapphire substrate. The sapphire substrate provides electrical isolation between adjacent diodes. The PN junctions are selectively connected to a matrix of conductors so that output signals representing binary numbers having values from zero to a fixed maximum can be generated, depending on the states of the input signals.

In FIG. 3, for example, the diodes comprising column 1 of the decoder section, select one binary location in the sin $\Theta_i$ storage section identified as binary 1100. A binary number of 1 is mechanized in the first column by a diode between the conductor connected to $T_1$ and the horizontal conductor running to the most significant bit of the output register. Diodes are connected between the $\Theta_1$ and $T_1$, $\Theta_2$ and $T_1$, $\Theta_3'$ and $T_1$, and between $\Theta_4'$ and $T_1$ conductors in order to give the first column a decoded value of 1100. Column 2 would then mechanize a binary number of one less. Each column would be reduced by a binary one from the maximum storage location 1100 to the minimum storage location 0000. The last column selects storage location 0000. All the conductors of the last column are connected to the primes of the $\Theta_1$ through $\Theta_4$ input conductors.

If the sin $\Theta$ value stored in location 1100 were selected, the computer would generate true signals on the input conductors $\Theta_1$, $\Theta_2$. For the particular embodiment shown, a logical true signal is represented by a plus voltage level and a logical false signal is represented by a zero voltage level. $T_1$ is assumed to have a plus voltage value. Therefore, if $\Theta_1$ and $\Theta_2$ are both true, and $T_1$ is true, the plus voltage on $T_1$ would turn diode 20 on and provide current flow to the output conductor. The current flow on that conductor would be received by computer 2 and would indicate the binary value of 1. This is the stored sin $\Theta$ value since $\Theta - 1100$ (85° 57′) has a sine value to five bit accuracy of one. Following that readout, $T_1$ would become false and $T_1'$ would become true for a selected input and a second output would occur representing $\Delta\Theta \cos \Theta_i$. For example, for a $\Theta$ value for which $\Delta_3$ is true, a $\Delta$ location of 001 would be selected and current would be generated in the conductor connected to diode 21. The output values are summed by computer 2 with sin $\Theta_i$ to provide a binary number indicating the sum of sin $\Theta_i$ and $\Delta\Theta \cos \Theta_i$ computer 2 may be programmed to execute a subroutine as indicated above for adding the numbers. The number may be converted into an analogue number for generating an error signal if necessary.

A more specific example is described below. If the angle read by the analogue generator means had been 30° 26.5 minutes, a signal having a radian value of 0.10001 would have been generated. $\Theta_i$ would have a value of 0.100 radians and $\Delta\Theta$ would have a value of .00001 radians. The value of sine 0.100 radians stored in memory would be .01110 and the value of $\Delta\Theta \cos \Theta_i$ would be .000100. This later value would be addressed by $\Delta = 010$. This $\Delta$ is generated from the input $\Theta$. By adding the two numbers a sine value of 0.10000 to 5-bit accuracy would be generated. The calculation is summarized as follows, if, $\Theta = 0.10001$ radians (30° 26.5′)
then, $\Theta_i = 0.100$ radians and $\Delta\Theta = .00001$
sin $\Theta_i$ (from memory) = .011110
$\Delta\Theta \cos \Theta_i$ (from memory) = .000010
$\sin \Theta = \sin \Theta_i + \Delta\Theta \cos \Theta_i = .10000$ (5-bit accuracy)

It should be noted that for the accuracy used in the above example, 20 values were required to be stored in memory. Thirteen sin $\Theta_i$ values and 7 $\Delta\Theta \cos \Theta_i$ values were stored. A straight table lookup would have required storage of 51 values. The difference between these two numbers can be seen to increase very rapidly as the accuracy is increased.

Although the invention has been described and illustrated in detail, it is to be understood that the same is by way of illustration and example only, and is not to be taken by way of limitation; the spirit and scope of this invention being limited only by the terms of the appended claims.

I claim:

1. A sine-cosine generator comprising fixed diode matrix means, including a memory, for storing binary values representing the value of the sine of a plurality of angles including means for selecting locations within said memory, said diode matrix mechanizing an interpolation scheme for reducing the amount of storage required for generating sine or cosine values, said matrix comprising a first section for storing sine values and a second section relatively smaller than the first, for storing trigonometric function values of angles for completing the interpolation scheme, said first section storing sin $\Theta_i$ values and said second section storing $\Delta\Theta \cos \Theta_i$ values for mechanizing the linear Taylor Series, where $\Theta_i$ represents an angle between 0° and 90° and $\Delta\Theta$ represents an angle increment obtained from $(\Theta - \Theta_i)$ where $\Theta$ is the angle whose sine value is represented by the sin $\Theta_i$ $\Delta\Theta \cos \Theta_i$.

2. The combination as recited in claim 1, including means for adding the sin $\Theta_i$ values to the $\Delta\Theta \cos \Theta_i$ values for generating sine $\Theta$ values.

3. A sine-cosine generator comprising fixed diode matrix means, including a memory, for storing binary values representing the value of the sine of a plurality of angles including means for selecting locations within said memory, said memory comprising a matrix of conductors having diodes selectively connected between said conductors for forming an array of diodes.

4. A sine-cosine generator comprising fixed diode matrix means, including a memory, for storing binary values representing the value of the sine of a plurality of angles including means for selecting locations within said memory, said diode matrix means including a matrix of conductors having diodes selectively connected between said conductors for forming a binary array of diodes, said matrix including a first plurality of conductors extending in a first direction and a second plurality of conductors extending in a second direction substantially orthogonal to the first conductors, diodes being connected between said conductors of said first plurality of conductors and conductors of said second plurality of conductors at certain intersections of said conductors for mechanizing a count having a maximum and minimum value, said binary value representing address locations within the storage portion of said matrix, said first plurality of conductors being divided into first and second separated portions, said first portion mechanizing a first binary count and said second portion mechanizing a second binary count, said first portion representing address locations of sin $\Theta_i$ values stored in a first storage portion of the matrix means, and said second portion representing address locations of $\Delta\Theta \cos \Theta_i$ values stored in a second storage portion of the matrix means, including means for selecting which of said address locations are accessed.

5. A sine-cosine generator comprising fixed diode matrix means, including a memory, for storing binary values representing the value of the sine of a plurality of angles including means for selecting locations within said memory, said memory comprising a matrix of conductors having diodes selectively connected between said conductors for forming a binary array of diodes, said matrix including a first plurality of conductors extending in a first direction and a second plurality of conductors extending in a second direction substantially orthogonal to the first conductors, diodes being selectively connected between conductors of said first plurality of conductors and conductors of said second plurality of conductors where conductors intersect for mechanizing a consecutive sequence of binary numbers having a maximum and a minimum value, each of said numbers indicating an address location within the portion of the diode matrix means storing said sine values.

6. The combination as recited in claim 5, wherein said memory diodes mechanize fixed values for sin $\Theta$ values with a first address location representing a first binary value of a sin $\Theta$ value, said first address being addressed by a first column of said first plurality of conductors.

7. The combination as recited in claim 5, wherein an address location is selected by turning on certain of said diodes excluding the diodes connected to the conductors which represent the selected location.